United States Patent [19]

Platus et al.

[11] Patent Number: 5,549,270
[45] Date of Patent: Aug. 27, 1996

[54] VIBRATION ISOLATION SYSTEM

[75] Inventors: David L. Platus, Los Angeles; Patrick J. Cunningham, Fullerton, both of Calif.

[73] Assignee: Minus K Technology, Inc., Inglewood, Calif.

[21] Appl. No.: 390,809

[22] Filed: Feb. 15, 1995

Related U.S. Application Data

[63] Continuation of Ser. No. 125,496, Sep. 22, 1993, abandoned, which is a continuation of Ser. No. 987,046, Dec. 4, 1992, abandoned, which is a continuation-in-part of Ser. No. 708,995, May 31, 1991, Pat. No. 5,178,357, which is a continuation-in-part of Ser. No. 681,808, Apr. 8, 1991, abandoned, which is a continuation-in-part of Ser. No. 395,093, Aug. 16, 1989, abandoned.

[51] Int. Cl.$^6$ ............................................. F16M 13/00
[52] U.S. Cl. ........................................... 248/619; 248/638
[58] Field of Search ................................. 248/619, 603, 248/620, 623, 632, 621, 638, 678, 565, 576

[56] References Cited

U.S. PATENT DOCUMENTS

| | | | |
|---|---|---|---|
| 1,545,540 | 7/1925 | Wills | 248/619 |
| 2,313,893 | 3/1943 | Rushing | 248/619 X |
| 2,572,919 | 10/1951 | French et al. | 248/619 X |
| 2,580,815 | 1/1952 | Mooney et al. | |
| 2,756,952 | 7/1956 | Gazley | 248/567 |
| 2,924,420 | 2/1960 | Fink | 248/632 X |
| 2,932,482 | 5/1960 | Dickie | 248/619 |
| 2,941,777 | 6/1960 | Aller et al. | 248/358 |
| 2,960,302 | 11/1960 | Brown | 248/180.1 |
| 2,978,241 | 4/1961 | Plastow | 267/160 |
| 3,028,138 | 4/1962 | Wells | 248/619 |
| 3,080,160 | 3/1963 | Omer | 267/160 |
| 3,223,400 | 12/1965 | Deister, Jr. | 248/619 X |
| 3,266,758 | 8/1966 | Ormond | 248/554 |
| 3,447,671 | 6/1969 | Schweinforth | 198/220 |
| 3,464,657 | 9/1969 | Bullard | 248/550 |
| 3,465,997 | 9/1969 | Piske | 248/350 |
| 3,592,422 | 7/1971 | Paine et al. | 248/589 |
| 3,606,704 | 9/1971 | Denton | 248/619 X |
| 3,727,865 | 4/1973 | Melrose et al. | 248/632 |
| 3,952,979 | 4/1976 | Hansen | 248/550 |
| 4,101,102 | 7/1978 | Lloyd | 248/638 |
| 4,325,133 | 4/1982 | Reitmayer | 248/263 |
| 4,355,469 | 10/1982 | Nevins et al. | 248/604 X |
| 4,372,520 | 2/1983 | Shutt | 248/604 |
| 4,402,483 | 9/1983 | Kurabayashi et al. | 248/636 |
| 4,511,115 | 4/1985 | Ludwigsen | 248/603 X |
| 4,537,382 | 8/1985 | Beck | 248/658 |
| 4,572,471 | 2/1986 | Schrepfer | 248/560 |
| 4,605,194 | 8/1986 | Binnig et al. | 248/559 |
| 4,643,385 | 2/1987 | Sandercock | 248/550 |
| 4,740,057 | 4/1988 | Dezso | 350/252 |
| 4,778,037 | 10/1988 | Papadopohlos | 248/603 X |
| 4,871,142 | 10/1989 | DeMey, II | 248/632 |
| 5,040,764 | 8/1991 | Dubois | 248/638 X |

(List continued on next page.)

FOREIGN PATENT DOCUMENTS

| | | | |
|---|---|---|---|
| 345042 | 8/1978 | Austria . | |
| 1073623 | 9/1954 | France . | |
| 1250019 | 11/1960 | France . | |
| 2049424 | 3/1971 | France . | |
| 3234618A1 | 3/1984 | Germany . | |
| 58-28035 | 2/1983 | Japan | 248/620 |
| 6505951 | 11/1966 | Netherlands . | |
| 0394969 | 7/1933 | United Kingdom | 248/620 |
| 617076 | 2/1949 | United Kingdom . | |
| 901756 | 7/1962 | United Kingdom . | |
| 1085319 | 9/1967 | United Kingdom . | |
| WO91/02921 | 3/1991 | WIPO . | |

*Primary Examiner*—Ramon O. Ramirez
*Attorney, Agent, or Firm*—Fulwider Patton Lee & Utecht

[57] ABSTRACT

An improved omnidirectional vibration isolating suspension apparatus for supporting an object in an equilibrium position relative to a base while suppressing transmission of vibratory motion between the object and the base, in which an isolator internal structure resonant frequencies can be significantly increased while the isolator provides low vertical and horizontal stiffness and low resonant frequencies.

26 Claims, 4 Drawing Sheets

U.S. PATENT DOCUMENTS

| | | | |
|---|---|---|---|
| 5,110,082 | 5/1992 | Rowan, Jr. | 248/678 |
| 5,169,110 | 12/1992 | Snaith et al. | 248/619 X |
| 5,178,357 | 1/1993 | Platus | 248/619 |
| 5,244,170 | 9/1993 | Shekher | 244/158 R |
| 5,310,157 | 5/1994 | Platus | 248/619 |
| 5,370,352 | 12/1994 | Platus | 248/619 |
| 5,390,892 | 2/1995 | Platus | 248/619 |

VIBRATION ISOLATION SYSTEM

RELATED APPLICATIONS

This application is a continuation, of application Ser. No. 08/125,496 filed Sep. 22, 1993 now abandoned, which is a continuation of application Ser. No. 07/987,046 filed on Dec. 4, 1982, now abandoned which is a continuation-in-part of application Ser. No. 07/708,995, filed May 31, 1991, entitled "Vibration Isolation System" now U.S. Pat. No. 5,178,357, which is a continuation-in-part of application Ser. No. 07/681,808, filed Apr. 8, 1991, entitled "DAMPED VIBRATION ISOLATION SYSTEM" abandoned; which is a continuation-in-part of application Ser. No. 395,093, filed Aug. 16, 1989, entitled "VIBRATION ISOLATION SYSTEM" abandoned.

BACKGROUND OF THE INVENTION

1. Field Of The Invention

This invention relates generally to suspension systems and methods for isolating and reducing the transmission of vibratory motion between an object and a base and, more particularly, to a compact omnidirectional vibration isolation or suspension system that exhibits low stiffness, high damping to limit resonant responses of the system, effective isolation at the higher frequencies, high isolator resonant frequencies, and can accommodate changing weight loads without significantly degrading isolation system performance.

2. Description of the Related Art

The problems caused by unwanted vibration on motion-sensitive equipment and devices have been widely researched and numerous solutions to prevent or reduce the transmission of vibratory motion have been proposed and developed. Many of the devices designed to reduce the transmission of unwanted vibration between an object and its surroundings, commonly called vibration isolators or suspension devices, have utilized various combinations of elements such as resilient pads made from a variety of materials, various types of mechanical springs, and pneumatic devices. There are, however, shortcomings and disadvantages associated with these particular prior art isolation systems which prevent them from obtaining low system natural frequencies and from limiting resonant responses to low values while providing high isolation performance at the higher frequencies.

These shortcomings and disadvantages of prior art systems were addressed through my development of a novel vibration isolation system and novel devices and methods for retrofitting existing vibrating isolation systems described in my application Ser. No. 07/395,093, filed Aug. 16, 1989, entitled Vibration Isolation System, my application filed Apr. 8, 1991, entitled "DAMPED VIBRATION ISOLATION SYSTEM," and my co-pending application, Ser. No. 708,995, filed May 31, 1991, entitled "VIBRATION ISOLATION SYSTEM," which are all hereby incorporated by reference in this present application. The particular vibration isolation system described in my three applications and utilized in connection with the present invention provides versatile vibration isolation by exhibiting low stiffness in an axial direction (generally the direction of the payload weight) and any direction substantially transverse to the axial direction (generally a horizontal direction). The particular system utilizes a combination of isolators that can be connected together axially in series to provide omnidirectional isolation. Each isolator is designed to isolate either the axial or the transverse component of any vibratory motion to effectively isolate vibrations in all directions. In subsequent discussions, an axial-motion isolator will be referred to as a vertical-motion isolator, and the system of axial-motion isolators will be referred to as the vertical-motion isolation system. Similarly, a transverse-motion isolator will be referred to as a horizontal-motion isolator, and the system of transverse-motion isolators will be referred to as the horizontal-motion isolation system.

In the embodiments described in my co-pending applications, the isolator relies on a principle of loading a particular elastic structure which forms the isolator or a portion of it (the loading being applied by either the supported weight or by an external loading mechanism) to approach the elastic structure's point of elastic instability. This loading to approach this point of elastic instability, also called the "critical buckling load" of the structure, causes a substantial reduction of either the vertical or the horizontal stiffness of the isolator to create an isolation system that has low stiffness (that can be made zero or near zero) in the vertical and in any horizontal direction, and increases the damping inherent in the structure. While stiffness is reduced, these isolators still retain the ability to support the payload weight.

If the load on an elastic structure with an instability is greater than the critical buckling load, the excessive load will tend to propel the structure into its buckled shape, creating a "negative-stiffness" or "negative-spring-rate" mechanism. By combining a negative-stiffness mechanism with a spring, adjusted so that the negative stiffness cancels or nearly cancels the positive stiffness of the spring, one obtains a device that can be placed at or near its point of elastic instability. The magnitude of the load causing the negative stiffness can be adjusted, creating an isolator that can be "fine tuned" to the particular stiffness desired.

SUMMARY OF THE INVENTION

The present invention provides novel means for improving the performance of my vibration isolation systems described in my previously filed applications and for providing more compact configurations. With the present invention, the isolator's internal structure resonant frequencies can be significantly increased while the isolator provides the same low vertical and horizontal stiffness and low system resonant frequencies, so that improved performance results at higher frequencies. The present invention also provides improved performance of a composite isolator consisting of a vertical-motion isolator with radial flexures connected to a center hub and one or more horizontal-motion beam-column isolators operatively connected to the center hub, by increasing the rotational stiffness of the center hub relative to the base about any horizontal axis and thereby provides a more stable platform for the beam-columns and better decoupling between the vertical-motion isolator and the horizontal-motion isolator.

The present invention also provides a means for passively accommodating greater redistributions in isolated object weight, as occurs in equipment with moving stages such as wafer steppers and coordinate measurement machines and other applications, without exceeding the free-travel capability of the vertical-motion isolators. This means consists of tailoring the rotational or rocking stiffness of the isolators about any horizontal axis in order to limit the rocking displacements of the isolated object in response to moments caused by the redistribution of isolated object weight.

The present invention also provides improved performance of a vertical-motion isolator that uses an adjusting nut to raise and lower the base of the payload support spring in order to accommodate different weight loads and to adjust the position of the isolator between the upper and lower stops.

A typical vertical-motion isolator made in accordance with the present invention utilizes a spring means to support the payload weight and a negative-stiffness mechanism comprising radially-compressed radial flexure assemblies that connect at their inner ends to a center hub. The spring means connects between the center hub and a base. The outer end of at least one of the radial flexure assemblies connects to a connector block that connects to a deformed elastic loading flexure assembly that provides the radial compressive loads. Each radial flexure assembly comprises at least two radial flexures as flat spring elements spaced apart in the vertical direction and each loading flexure assembly comprises at least two loading flexures or flat spring elements spaced apart in the radial direction. One end of each loading flexure connects to the connector block and the other end connects to the base. A horizontal-motion isolator comprising an elastic structure that has relatively high stiffness in the vertical direction and low stiffness in any horizontal direction operatively connects between the center hub and the payload.

The combination of vertically-spaced radial flexures and radially-spaced loading flexures connected by a connector block provides an isolator structure that has relatively low stiffness for vertical translation of the center hub relative to the base and relatively low stiffness of the loading flexures in response to radial deflection of the connector block so as to maintain a very nearly constant radial force on the radial flexures and a very nearly constant negative-stiffness effect. However, the isolator structure is very stiff in response to rotations or horizontal translations of the center hub relative to the base, which results in very high isolator resonances associated with these modes of deformation and very high frequencies up to which the isolation system transmissibility behavior approaches the near-ideal single-degree-of-freedom system behavior, thereby improving the high-frequency isolation performance of isolation systems made in accordance with the present invention.

The high stiffness of the present vertical-motion isolator structure in response to rotations or horizontal translations of the center hub relative to the base also provides a more stable platform for a horizontal-motion isolator, such as one or more beam-columns, operatively connected to the center hub to produce an omnidirectional composite isolator.

In one particular form of a composite isolator made in accordance with the present invention, the vertical-motion isolator utilizes a coil spring, operatively connected between a center hub and a base platform to support the payload weight, and a negative-stiffness mechanism connected to the center hub that removes stiffness from the spring. The negative-stiffness mechanism comprises two radial flexure assemblies spaced 180° apart, the outer end of one radial flexure assembly connecting to a rigid support post that extends upward from the base platform and the outer end of the other radial flexure assembly connecting through a connector block to a loading flexure assembly that imparts radial compressive load to the radial flexure assemblies, thereby producing the negative-stiffness effect.

Each radial flexure assembly comprises two horizontally-spaced pairs of radial flexure elements, each pair comprising two radial flexure elements spaced apart vertically with spacer blocks at the center hub and at their outer ends. The loading flexure assembly comprises two loading flexures, spaced apart radially, which are cantilevered upward from the base platform and connected at their upper ends to a connector block attached to one radial flexure assembly. The isolator is designed and assembled so that the upper ends of the loading flexures are displaced radially outward relative to their lower ends to as to deform the flexures in bending and impart the radial compressive load to the radial flexure assemblies. A third flexure is cantilevered upward from the base platform and is connected to the connector block through an adjustment screw that can vary the radial deflection and radial force imparted to the radial flexure assembly, thereby providing a means for fine-tuning the stiffness of the vertical-motion isolator.

The coil spring attaches at its upper end to an upper spring support that is part of the center hub, and at its lower end to a lower spring support that surrounds and is guided by a spring support tube that extends upward from the base platform. The lower spring support is supported on a thrust bearing which is supported on an adjustment nut that turns on screw threads in the outer surface of the spring support tube. The adjustment nut raises and lowers the base of the spring so as to accommodate different weight loads and maintain the center hub at its equilibrium position relative to the base platform, the operating position of the vertical-motion isolator. The coil spring has three coils wound together at each end. The upper and lower spring supports extend into the spring the distance of the three coils and the spring is secured to the supports at both ends by clamps that surround the three coils and clamp them rigidly to the spring supports so as to prevent movement of the spring relative to the supports as the adjusting nut is turned. The lower spring support is connected to an anti-rotation device comprising a plate with a U-shaped slot that extends radially outward from the support and a post that extends upward from the base platform and fits within the slot With very small clearance so as to prevent the lower spring support from rotating as it translates vertically. Rotation of the spring or movement of the spring relative to the supports can cause a small change in the stiffness of the spring and a significant change in the net stiffness of the isolator, particularly when the negative-stiffness effect closely approaches the positive stiffness of the spring to produce very low net stiffness of the isolator.

The horizontal-motion isolator is operatively connected vertically in series with the vertical-motion isolator and the object, and it comprises three flexible beam-columns in the form of thin rods connected between a column base plate and a column top plate. The column base plate is located below the isolator base platform and connects to the bottom end of a center post which is connected at its upper end to the upper spring support and extends down through the spring support tube and the base platform. The beam-columns pass through openings in the isolator base platform and connect to the column base plate and the column top plate through end fittings. Because of the high bending stiffness of the center post and the high rotational stiffness of the center hub due to the spaced apart radial flexures and spaced apart loading cantilevers, the column base plate is constrained to move easily only in the vertical direction and thereby provides a stable base for the horizontal-motion isolator and effectively decouples the vertical-motion and horizontal-motion isolators. Flexures in the form of flat springs operatively connect between the column base plate and the isolator base platform in order to further stabilize the column base plate against horizontal motions and rotations about horizontal axes, and to increase the isolator structure resonant frequencies.

The column top plate is connected to a load plate through a top flexure which has the form of a rod with a reduced-diameter section to provide a low rocking stiffness of the load plate relative to the column top plate, about any horizontal axis, while providing high stiffness for translation of the load plate relative to the column top plate in any horizontal direction. The load plate attaches to the payload or payload platform. With this composite isolator configuration a suspension system of three or more such isolators can provide low stiffness, low system natural frequencies and effective vibration isolation in all six degrees of freedom while maintaining high isolator structure resonant frequencies. Without the top flexure, or other means of providing low rocking stiffness and high translational stiffness between the payload and the column top plate, stiffening the isolator structure to provide high structural resonances (eg. over 100 Hz) will also result in higher system rocking frequencies (pitch or roll) and will tend to reduce the effectiveness of isolation for rocking vibrational inputs.

There are applications where increasing the isolator rocking stiffness and the system rocking natural frequencies relative to the system vertical and horizontal natural frequencies would be beneficial. Examples are applications in which the payload has moving stages, such as wafer steppers, coordinate measurement machines and other inspection systems which redistribute the object weight and cause tilting or rocking of the payload. Very-low-frequency six-degree-of-freedom passive isolation systems cannot tolerate much weight redistribution because it causes excessive tilt so that the isolators contact the stops in the vertical direction. By increasing the rocking stiffness of the top flexure, and thereby, the system natural rocking frequencies, the tolerance to weight redistributions increases. Rocking vibrational inputs are generally much lower than vertical and horizontal vibrational inputs so that increasing the system rocking natural frequencies will not seriously reduce the effectiveness of the vibration isolation system in many cases. For example, an isolation system utilizing composite isolators based on the present invention could provide vertical and horizontal natural frequencies of 0.75 Hz and rocking natural frequencies of 2.0 Hz and accommodate a useful range of stage motion weight redistributions. Because of the low rocking input vibrations compared with the vertical and horizontal input vibrations, the 2.0 Hz rocking natural frequencies would not seriously reduce the overall isolation effectiveness of the system.

The horizontal-motion isolator can be designed to utilize the stiffness reducing negative-stiffness beam-column effect to whatever extent is needed based on the design requirements and constraints. If space constraints dictate a small isolator height and small column length, and very low stiffness is required, the column can be designed so that the weight load closely approaches the column critical buckling load in order to produce the very low stiffness with a compact design. If space constraints are not important, for many applications adequately low stiffness can be achieved with a longer column design where the weight load is a small fraction of the column critical buckling load. This latter design with relatively small negative-stiffness effect has the advantage that the horizontal stiffness is less sensitive to changes in weight load.

Stops with relatively high load capacity limit the composite isolator's vertical and horizontal deflections, protecting the more sensitive elements, namely the radial flexures and the columns, from overload, and thereby producing a rugged isolator. Leveling screws in the base platform serve to level the isolator and the payload platform and to position the payload horizontally relative to the isolators so as to center horizontal stop pins in holes in a load plate that attaches to the payload platform. This is the operating position of the horizontal-motion isolation system. The vertical-motion isolator is adjusted to its operating position with the weight load adjustment nut, so as to provide proper clearance between the upper and lower vertical stops.

All in all, the present invention provides an improved vertical-motion isolator that is compact and offers improved performance through higher isolator structure resonant frequencies and better decoupling between the vertical and horizontal-motion isolators, and improved performance in response to adjustments for changes in weight load; and an improved more compact composite isolator that passively accommodates greater weight redistributions of the supported object as occurs, for example, in payloads with stages that translate. Other features and advantages of the present invention will become apparent from the following detailed descriptions when taken in conjunction with the accompanying drawings which, illustrate, by way of example, the principles of the present invention.

DETAILED DESCRIPTION OF THE PREFERRED EMBODIMENT

As is shown in the drawings for purposes of illustration, the present invention is embodied in a vibration-isolating suspension system comprising a payload platform supported on several composite vertical-motion and horizontal-motion isolators. Composite isolators made in accordance with the present invention are capable of significantly higher isolator internal structure resonant frequencies and better de-coupling of the vertical-motion and horizontal-motion isolators. The vibration-isolating suspension can passively accommodate greater redistributions of the payload weight. Also, vertical-motion isolators made in accordance with the present invention provide improved performance when an adjusting nut is used to raise and lower the base of the support spring in order to accommodate different weight loads. The present invention also provides a more compact composite isolator configuration when a spring such as a coil spring is used as the support spring in the vertical-motion isolator.

Figure 1:
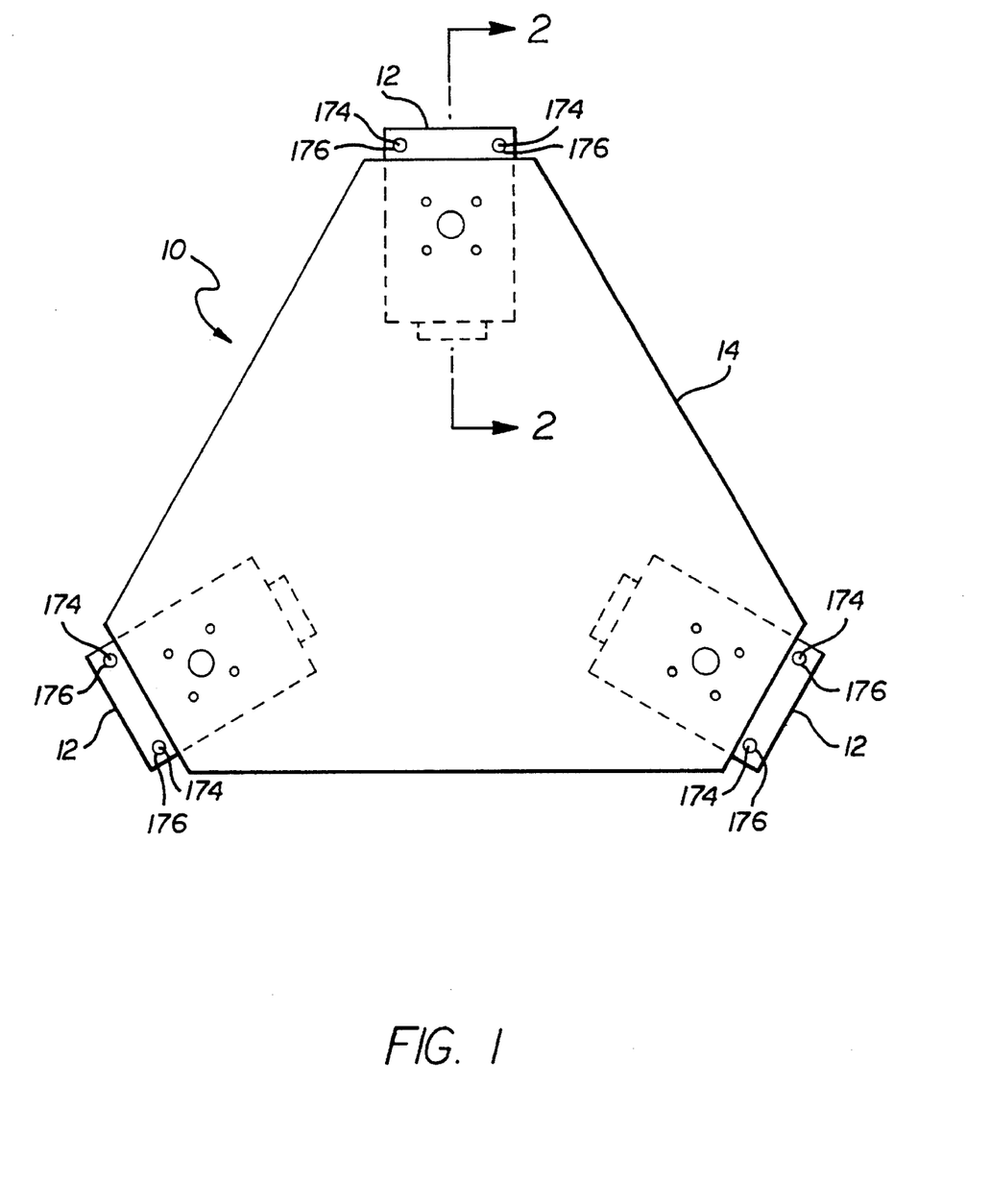
FIG. 1 is a plan view of one embodiment of a vibration isolation system made in accordance with the present invention.
Figure 2:
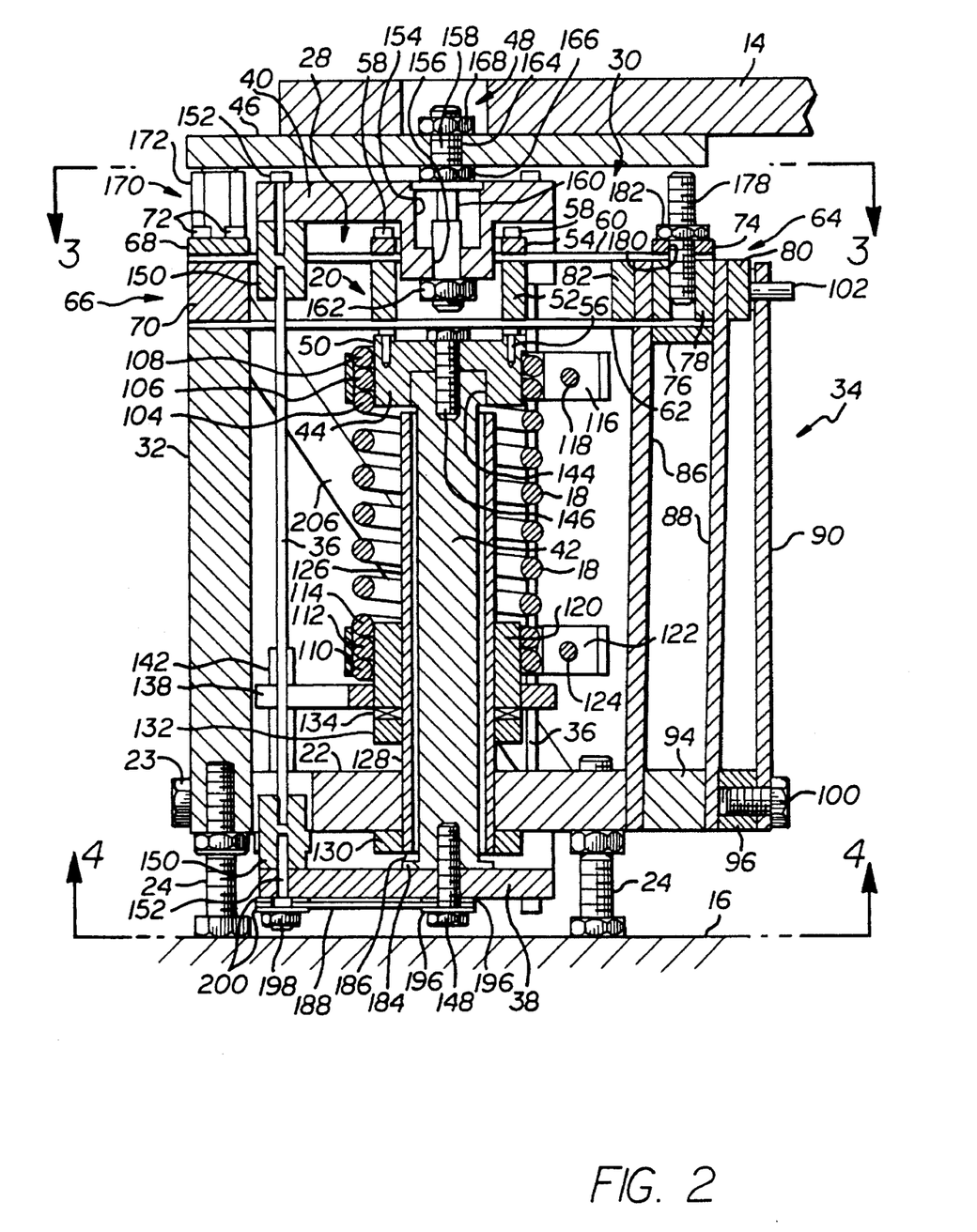
FIG. 2 is a partial cross-sectional side view of the embodiment shown in FIG. 1 taken along line 2—2.
Figure 3:
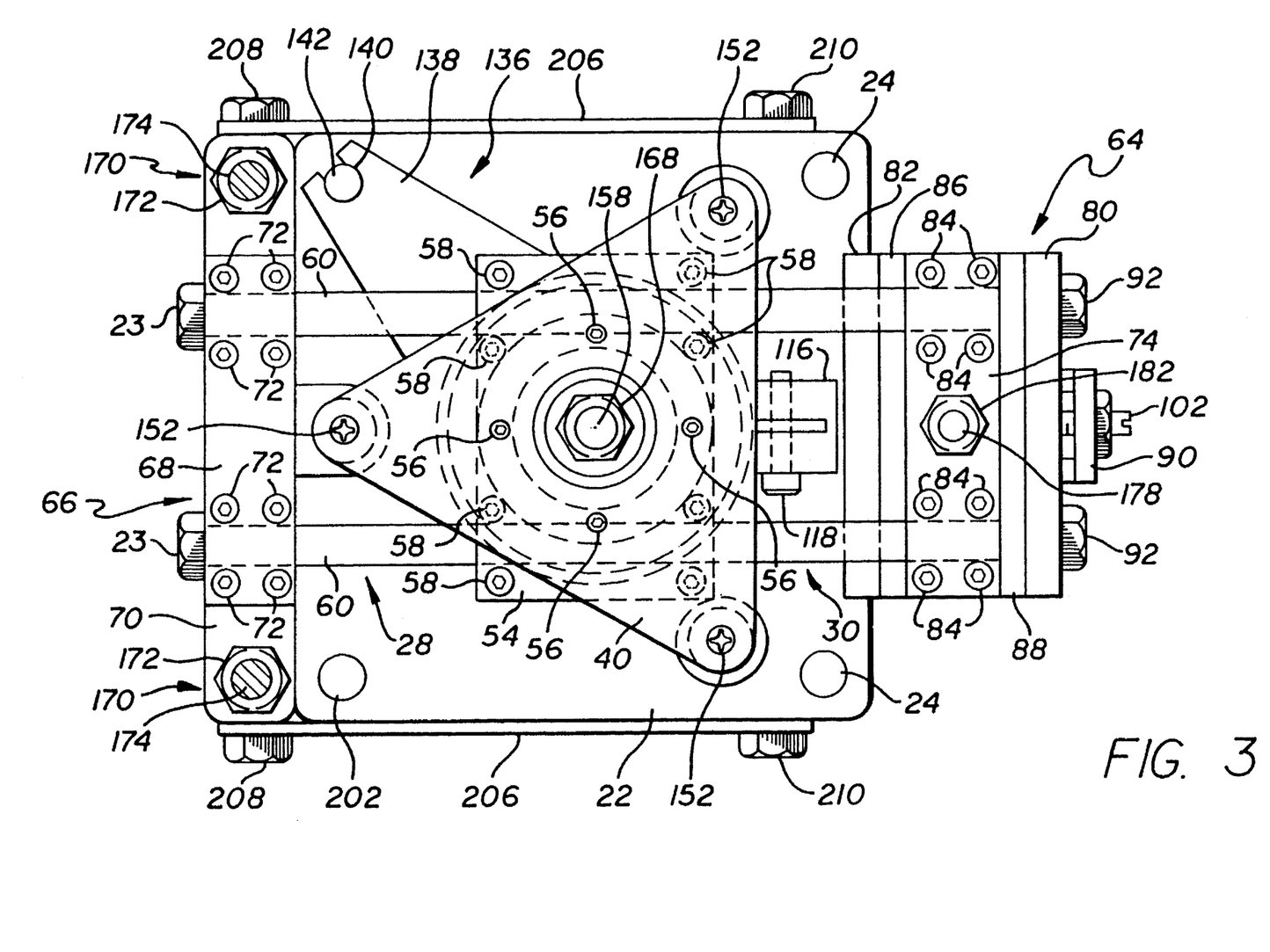
FIG. 3 is a partial cross-sectional plan view of the embodiment shown in FIG. 1 taken along line 3—3 in FIG. 2.
Figure 4:
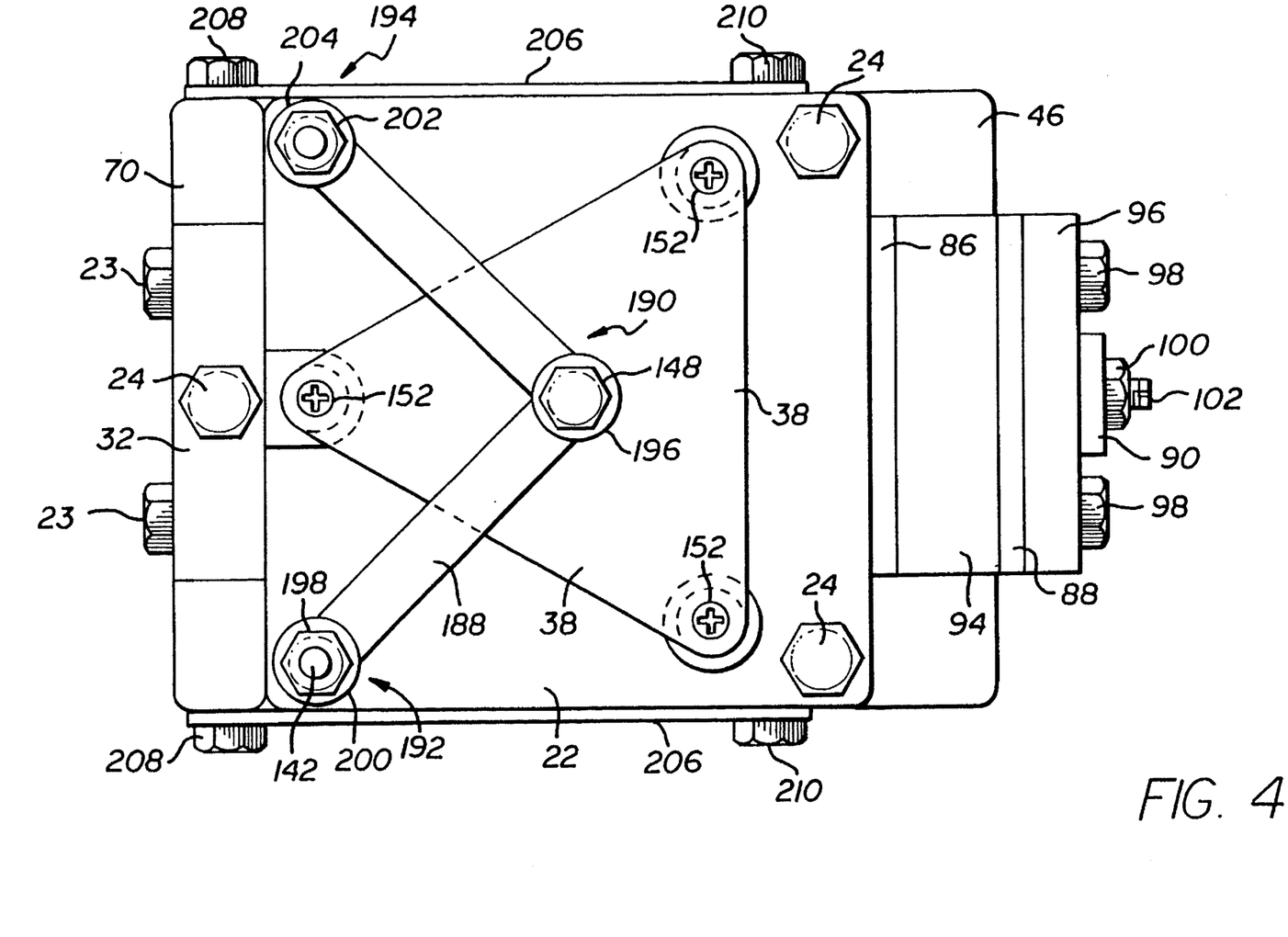
FIG. 4 is a partial bottom view of the embodiment shown in FIG. 1 taken along line 4—4 in FIG. 2.

FIG. 1 shows one embodiment of an isolation system made in accordance with the present invention. The system 10 uses several novel composite vibration isolation apparatus or isolators 12 to resiliently support the object to be isolated (not shown) on the payload platform 14. In the system 10, three such isolators support the payload platform 14 relative to a foundation and reduce the transmission of omnidirectional vibrations between an object supported on the payload platform and the foundation.

Referring now to FIGS. 1, 2, 3, and 4, one embodiment of a composite isolator is illustrated. The composite isolator comprises a vertical-motion isolator operatively connected vertically in series with a horizontal-motion isolator. The vertical-motion isolator includes a support spring 18 in the form of a coil spring that operatively connects between a center hub assembly 20 and a base platform 22 that is connected to foundation 16 by three leveling screws 24. The spring 18 supports the object weight load that is transmitted to the center hub 20 through the horizontal-motion isolator that is operatively connected between the center hub assembly 20 and the payload platform 14. A negative-stiffness mechanism is also connected to the center hub assembly 20 and counter acts the positive stiffness of the spring 18. The negative-stiffness mechanism comprises radially-compressed radial flexure assemblies 28 and 30 that connect at their inner ends to the center hub assembly 20. The outer end of radial flexure assembly 28 connects to a rigid support post 32 that is attached to the base platform 22 with screws 23. The outer end of radial flexure assembly 30 connects to the upper end of a loading cantilever assembly 34 that attaches at its lower end to the base platform 22 and is assembled in a pre-deformed state so as to provide radial compressive load to the radial flexure assemblies 28 and 30. The net vertical stiffness of the vertical-motion isolator can be made very low by applying sufficient compressive load to the radial flexure assemblies 28 and 30 so that the negative stiffness produced nearly cancels the positive stiffness of the spring 18.

The horizontal-motion isolator comprises three flexible beam-columns 36 in the form of thin cylindrical rods that are operatively connected between a column base plate 38 and a column top plate 40. The column base plate 38 connects to a stiff center post 42 that connects to an upper spring support 44 which is part of the center hub assembly 20, thereby providing a relatively rigid connection between the column base plate 38, which is the base of the horizontal-motion isolator, and the center hub assembly 20 which is the top of the vertical-motion isolator. The column top plate 40 connects to a load plate 46 through a tilt flexure assembly 48 which acts as a tilt-motion isolator and that provides relatively high vertical and horizontal stiffness between the column top plate 40 and the load plate 46 and relatively low stiffness for rocking or tilting displacement (pitch or roll) between the column top plate 40 and the load plate 46. The load plate is rigidly connected to the payload platform 14 that supports the object. Horizontal-motion isolation is provided in any horizontal direction by the low stiffness of the beam-columns 36 in response to horizontal translation of the column top plate 40 relative to the column base plate 38. This horizontal stiffness can be made very low by loading the beam-columns 36 to approach their critical buckling loads.

The low rocking stiffness of the tilt flexure assembly 48 (the tilt-motion isolator) along with the low stiffness of the horizontal-motion and vertical-motion isolators provides for effective isolation in all six degrees of freedom, three translations and three rotations. The stiffness of the tilt flexure assembly 48, (the tilt-motion isolator), can also be increased in order to increase the rocking stiffness of the isolator and the system of isolators in order to accommodate greater redistributions of object weight without having the vertical isolators contact the vertical stops or to limit the rocking displacements in response to applied moments from other causes. Other features and advantages of the present invention will become apparent from a more complete description of the isolator configuration and construction details as shown in FIGS. 1–4.

The center hub assembly 20 comprises the upper spring support 44, a center nut plate 50, a center spacer block 52, and a center clamp plate 54. The center nut plate 50 is attached to the upper spring support 44 with screws 56. The center clamp plate 54 and center spacer block 52 are clamped to center nut plate 50 with screws 58 which also clamp upper radial flexures 60 between the center clamp plate 54 and center spacer block 52 and clamp the lower radial flexures 62 between the center spacer block 52 and center nut plate 50.

The radial flexure assembly 28 comprises portions of the two upper radial flexures 60 and the two lower radial flexures 62 that are clamped within the center hub assembly 20 and extend to and are clamped within an end assembly 66. The end assembly 66 comprises an end clamp plate 68 and an end block 70 that are clamped to support post 32 with screws 72.

The radial flexure assembly 30 comprises portions of the two upper radial flexures 60 and the two lower radial flexures 62 that are clamped within the center hub assembly 20 and extend to and are clamped within a cantilever connector assembly 64. The cantilever connector assembly 64 comprises a cantilever top clamp plate 74, a cantilever bottom nut plate 76, a cantilever spacer block 78, a cantilever side clamp plate 80 and a cantilever side nut plate 82. The two upper radial flexures 60 are clamped between the cantilever top clamp plate 74 and the cantilever spacer block 78, and the two lower radial flexures 62 are clamped between the cantilever spacer block 78 and the cantilever bottom nut plate 76 using screws 84.

The loading cantilever assembly 34 comprises two radially-spaced loading cantilevers 86 and 88 in the form of flat springs and an adjustment cantilever 90 in the form of a flat spring. Loading cantilevers 86 and 88 are spaced at their upper ends with cantilever spacer block 78 and are clamped to the cantilever spacer block 78 with the cantilever side clamp plate 80 and cantilever side nut plate 82 using screws 92. Loading cantilevers 86 and 88 are spaced at their lower ends with base spacer block 94 and are clamped to the base platform 22 with base clamp plate 96 and screws 98. During assembly, after the end assembly 66 and the center hub assembly 20 are secured, and the loading cantilevers 86 and 88 are secured to the base platform 22, but before tightening screws 84 that secure radial flexures 60 and 62 to the cantilever connector assembly 64, the cantilever connector assembly 64 is displaced radially outward relative to the center hub assembly 20 so as to deform the loading cantilevers 86 and 88 and create a prescribed inward radial compressive load on the radial flexure assemblies 28 and 30 in order to produce the desired negative-stiffness effect. The radial compressive load becomes operative when the forces required to displace the cantilever connector assembly 64 are removed. Various techniques can be used to apply the forces necessary to displace the cantilever connector assembly 64 during assembly of the isolator. For example, a screw jack can be positioned between the end assembly 66 and the cantilever connector assembly 64 in order to displace the cantilever connector assembly 64 away from the end assembly 66.

The adjustment cantilever 90 is clamped to the base clamp plate 96 with screw 100 and is used to apply an additional adjustable radial compressive force on the radial flexure assemblies 28 and 30 in order to adjust the negative stiffness effect and, thereby, the net vertical stiffness of the vertical-motion isolator. The adjustment force is applied by turning vertical stiffness adjustment screw 102 which is threadingly connected to adjustment cantilever 90 near its upper end and bears against cantilever side clamp plate 80 so as to displace the top of adjustment cantilever 90 outward and produce the desired adjustment radial compressive force.

The vertical-motion isolator support spring 18 has three coils 104, 106, and 108 wound together at its upper end and three coils 110, 112 and 114 wound together at its lower end. Coils 104, 106 and 108 are clamped to the upper spring support 44 with upper spring clamp 116 using screw 118. Coils 110, 112 and 114 are clamped to a lower spring support 120 with lower spring clamp 122 using screw 124. Lower spring support 120 surrounds and is guided by a spring support tube 126 that has a threaded outer surface 128 and is threaded into base platform 22 and secured with lock nut 130. A weight load adjustment nut 132 is threadingly connected to support tube 126 and supports the lower spring support 120 on a thrust bearing 134. The weight load adjustment nut 132 is used to raise and lower the base of support spring 18 for different weight loads on the isolator so as to maintain the center hub assembly 20 at its operating position which corresponds to the position where the radial flexures 60 and 62 are close to their straight undeformed shape and the vertical-motion isolator is floated between upper and lower stops that limit its vertical displacements. The thrust bearing 134 reduces the friction and the torsional resistance between the adjustment nut 132 and the lower spring support 120 from that which would result from direct contact between the adjustment nut 132 and the lower spring support 120.

The spring 18 is clamped to its upper support 44 and lower support 120 in order to prevent relative movement between the spring 18 and its supports 44 and 120 as the adjustment nut 132 is operated. Even small movement of the spring 18 relative to its supports 44 and 120 can change the effective stiffness of the spring 18 and cause a significant change in the net vertical stiffness of the isolator, particularly when the negative-stiffness effect from the radially compressed radial flexures 60 and 62 closely approaches the positive stiffness of spring 18 to produce very low net vertical stiffness of the isolator. Torsional deformation of the spring 18 can also change its effective stiffness and the net vertical stiffness of the isolator. An anti-rotation device 136 is used to prevent torsional deformation of the spring 18 as the adjustment nut 132 is operated. The anti-rotation device 136 comprises a radial plate extension 138 that is clamped to the lower spring support 120 and has a U-shaped slot 140 that engages a stop post 142 that is secured to and extends upward from the base platform 22 and fits within the slot 140 with very small clearance.

Center post 42 fits within cavity 144 in upper spring support 44 and is secured to upper spring support 44 with screw 146 and is secured to column base plate 38 with screw 148. The beam-columns 36 are press fit into fittings 150 at both ends of the beam-columns 36. The fittings 150 are secured to the column base plate 38 and top plate 40 with screws 152.

The column top plate 40 has a cup section 154 with threaded hole 156 into which is threaded the lower end of the tilt flexure assembly 48. The tilt flexure assembly 48 comprises a threaded tilt flexure rod 158 which has a reduced diameter section 160 which acts as the tilt flexure. The rod 158 is threaded into hole 156 in cup section 154 of column top plate 40, and is secured to the column top plate 40 with nut 162. The tilt flexure rod 158 passes through hole 164 in load plate 46 and is secured to load plate 46 with nuts 166 and 168.

Stops are provided to limit the vertical and horizontal displacements of the isolator. Two stop assemblies 170 are connected to and extend upward from end block 70 and serve as horizontal-motion and lower vertical-motion stops to limit the horizontal displacements and downward displacements of the load plate 46. The stop assembly 170 has a threaded lower section (not shown) that screws into end block 70, a hexagonal section 172 that limits the downward displacement of load plate 46 and a cylindrical pin 174 that protrudes upward from the center of the hexagonal section 170 and into a hole 176 in load plate 46 with a specified radial clearance so as to limit the horizontal displacement of the load plate 46. A stop post 178 protrudes upward from the center of the cantilever connector assembly 64 and serves as a third lower vertical-motion stop to limit the downward displacement of load plate 46. The stop post 178 is in the form of a threaded rod that passes through a hole 180 in the cantilever top clamp plate 74, screws into the cantilever spacer block 78 and is secured by lock nut 182. A flange 184 at the bottom of center post 42 serves as the stop that limits the upward displacement of the vertical-motion isolator by contacting the bottom end 186 of spring support tube 126.

A bottom flexure 188 in the form of an L-shaped flat spring operatively connects between the column base plate 38 and the isolator base platform 22 and serves to increase the isolator internal structural resonant frequencies. (See FIG. 4). The flexure has three holes (not shown in the figures), one at the knee 190 of the L, one near the end 192 of the L and one near the end 194 of the L. Screw 148 passes through the hole at the knee 190 and secures flexure 188 between washers 196 to the column base plate 38. The anti-rotation stop post 142 is threaded at its lower end and is screwed into a hole in base platform 22 and protrudes through the bottom of base platform 22 and through the hole near the end 192 of the bottom flexure 188. Nut 198 secures the stop post 142 to the base platform 22 and clamps the end 192 of flexure 188 between washers 200 to the base platform 22. Screw 202 passes through the hole in the end 194 of flexure 188 and secures flexure 188 between washers 204 to base platform 22. Bottom flexure 188 is very stiff in response to horizontal displacements of column base plate 38 relative to isolator base platform 22 but is very flexible in response to vertical displacements of column base plate 38 relative to isolator base platform 22.

Since the column base plate 38 and the center hub assembly 20 are stiffly connected together through the center post 42, the combined mass of the center hub assembly 20, the center post 42 and the column base plate 38 vibrating together horizontally relative to the isolator base platform 22 represents important isolator internal structural vibration modes. The high stiffness of the radial flexure assemblies 28 and 30 in response to horizontal displacements of the center hub assembly 20 relative to the end assembly 66 and the cantilever connector assembly 64, combined with the high stiffness of the support post 32 and the high stiffness of the loading cantilever assembly 34 for all displacements except radial displacements of the cantilever connector assembly 64 relative to the base platform 22, and the high stiffness of the bottom flexure 188 for horizontal displacements of the column base plate 38 relative to the base platform 22, results in high resonant frequencies for these isolator internal structural vibration modes. Even without the bottom flexure 188, the vertically-spaced radial flexures 60 and 62 and the radially-spaced loading cantilevers 86 and 88 with the stiff post 32 produce high stiffness in response to horizontal or rotational displacements of the center hub assembly 20 relative to the base platform 22 and high isolator internal structural resonant frequencies associated with the mass of the center hub assembly 20 and connected structure vibrating relative to the base platform 22. With the column base plate 38 stiffly connected to the center hub assembly 20 through the stiff center post 42, the column base plate 38 moves vertically with the center hub but provides a stable platform for the horizontal-motion isolator since it is restrained by high stiffness from horizontal or rotational displacements relative to the base platform 22.

This isolator embodiment of the present invention thereby more effectively decouples the vertical-motion and horizontal-motion isolators and provides high isolator internal structural resonant frequencies and provides improved isolation performance. The use of the bottom flexure 188 in conjunction with the vertically-spaced radial flexures 60 and 62 and radially-spaced loading cantilevers 86 and 88 provides even higher isolator internal structural resonant frequencies and better decoupling between the vertical-motion and horizontal-motion isolators.

Braces 206 connect at their upper ends to the end spacer block 70 with screws 208 and at their lower ends to base platform 22 with screws 210 and further increase the stiffness of the end assembly 66 in response to displacements relative to the base platform 22.

The composite isolator embodiment of FIGS. 1–4 permits a compact configuration while allowing the use of relatively long beam-columns and maintaining high isolator internal structural resonant frequencies. There are benefits from having the beam-columns as long as possible for a particular isolator height limit and very low horizontal stiffness requirements. An increase in beam-column length permits the beam-column to be designed so that its critical buckling load is further from the applied weight load, resulting in a smaller negative-stiffness effect and a smaller sensitivity in horizontal stiffness to changes in weight load. If sufficient height is available for the beam columns they can be designed with very low negative-stiffness effect and very low sensitivity to changes in weight load.

The high stiffness of the center hub assembly 20 in response to horizontal and rotational displacements relative to the base platform 22, due to the vertically-spaced radial flexures 60 and 62 and radially-spaced loading cantilevers 86 and 88, coupled with the stiff center post 42 and the bottom flexure 188, allows the column base plate 38 to be located near the bottom of the isolator and to serve as a stable platform for the beam-columns, with high stiffness in response to horizontal and rotational displacements relative to the base platform 22 and allows for a beam-column length close to the height of the composite isolator. Also, with this configuration the total isolator height is only slightly greater than the height of the vertical-motion isolator alone.

The use of the tilt flexure assembly 48 is a novel feature of the present invention and provides important benefits. The column base plate 38 is relatively free to move up and down with the center hub assembly 20 but is very stiff in response to all other displacements. Because of this and the high stiffness of the column top plate 40 and the high axial stiffness of the beam-columns 36, the column top plate 40 has low stiffness in response to horizontal displacements and in response to rotations about a vertical axis relative to base platform 22, but it is very stiff in response to rocking displacements (pitch and roll) relative to the base platform 22. The use of the tilt flexure assembly 48 between the column top plate 40 and the load plate 46 permits the composite isolator to be designed for a range of rocking stiffnesses from very high to very low. With very low rocking stiffness, the resulting isolation system can be designed for very low resonant frequencies in all six degrees of freedom, three translations and three rotations. Higher rocking stiffnesses can be used to limit the rocking displacements of the payload in response to applied rocking moments such as occurs in payloads with stages that translate horizontally. Since ground and floor rocking vibration magnitudes are typically much less than their vertical and horizontal vibration magnitudes, increasing the isolation System rocking can provide significant benefits with relatively small reduction in the overall isolation efficiency of the system.

The particular composite isolator configuration and construction methods illustrated in FIGS. 1–4 is just one of many arrangements which can incorporate the novel features of the present invention. Other configurations and construction methods will become apparent to those skilled in the art. For example, instead of using two radial flexure assemblies spaced 180° apart with one loading cantilever assembly and one stiff support post, three radial flexure assemblies spaced 120° apart could be used, each with a loading cantilever assembly, and the stiff support post could be eliminated.

The elements making up the present structure can be made from common structural materials such as steel and aluminum alloys, other structural materials having suitable strength and elastic properties can also be used.

While one particular form of the invention has been illustrated and described, it will be apparent that various modifications can be made without departing from the spirit and scope of the invention. Accordingly, it is not intended that the invention be limited, except as by the attached claims.

What is claimed is:

1. An omnidirectional vibration-isolating suspension system for supporting an object in an equilibrium position relative to a base while suppressing transmission of vibratory motion between the object and the base comprising:

at least one composite suspension apparatus connected between the object and the base, having first and second ends spaced apart to define an axial direction and comprising:

a first suspension device having first and second ends spaced apart in the axial direction, said first suspension device having force-supporting capability in the axial direction for supporting the object and relatively high axial stiffness and relatively high stiffness for relative rotations of said ends about axes transverse to the axial direction but relatively low stiffness for relative translations of said ends in directions transverse to the axial direction, wherein the first end of said first suspension device is located near the first end of said composite suspension apparatus and the second end of said first suspension device is located near the second end of said composite suspension apparatus;

a second suspension device having first and second ends spaced apart in the axial direction, said second suspension device connected axially in series with said first suspension device, wherein the first end of said second suspension device is located near the first end of said composite suspension apparatus and the second end of said second suspension device is located near the second end of said composite suspension apparatus, said second suspension device including:

spring means having first and second ends and adapted to provide positive stiffness in the axial direction and having force-supporting capability in the axial direction for supporting the object;

means for translating the second end of said spring means relative to said first end of said spring means and relative to the second end of said composite suspension apparatus;

a first spring support and means for securing said spring means near its first end to said first spring support in order to inhibit relative movement between said spring means and said first spring support when the second end of said spring means is translated relative to the first end of said spring means;

a second spring support and means for securing said spring means near its second end to said second spring support in order to inhibit relative movement between said spring means and said second spring support when the second end of said spring means is translated relative to the first end of said spring means;

anti-rotation means to inhibit rotation of the second end of said spring means relative to the second end of said composite suspension apparatus when the second end of said spring means is translated relative to the first end of said spring means; and means for producing negative stiffness in the axial direction operatively connected with said first spring support wherein said spring means and said negative-stiffness-producing means combine to produce low axial stiffness of said second suspension device which is the algebraic sum of the positive and negative stiffnesses, said negative-stiffness-producing means having relatively high stiffness in response to displacements of said first spring support relative to the second end of said second suspension device in directions transverse to the axial direction and relatively high stiffness in response to rotations of said first spring support relative to the second end of said second suspension device, said negative-stiffness-producing means comprising at least two flexures oriented in a radial direction transverse to the axial direction and spaced apart in the axial direction and operatively connected to and compressively loaded in the radial direction by a pre-deformed elastic structure means comprising at least two flexures spaced apart in the radial direction;

axially-symmetric flexure means positioned between the first end of said composite suspension apparatus and the first end of said first suspension device and operatively connected axially in series with said first suspension device, said axially-symmetric flexure means having relatively high stiffness in response to translations of the first end of said composite suspension apparatus relative to the first end of said first suspension device and relatively low stiffness in response to rotations of the first end of said composite suspension apparatus relative to the first end of said first suspension device about axes transverse to the axial direction; and a relatively stiff structural member connected axially in series between said first spring support of said second suspension device and said first suspension device near the second end of said first suspension device, said structural member providing a connection between said first and second suspension devices.

2. An omnidirectional vibration-isolating suspension apparatus for supporting an object in an equilibrium position relative to a base while suppressing transmission of vibratory motion between the object and the base, comprising:

a vertical-motion isolator operatively connected in series with a horizontal-motion isolator, said vertical-motion isolator comprising:

spring means having first and second ends and adapted to provide positive stiffness in the vertical direction and having force-supporting capability in the vertical direction for supporting the object; and means for producing negative stiffness in the vertical direction operatively connected with said spring means, wherein said spring means and said negative-stiffness=producing means combine to produce low vertical stiffness;

said horizontal-motion isolator having force-supporting capability in the vertical direction for supporting the object and relatively high stiffness in the vertical direction and low stiffness in any horizontal direction; and a tilt-motion isolator operatively connected in series with either of said vertical-motion or horizontal-motion isolator, said tilt-motion isolator having force-supporting capability in the vertical direction for supporting the object and relatively low rocking stiffness for reducing rocking vibration between the object and the base.

3. The omnidirectional vibration-isolating suspension apparatus as defined in claim 2 further including:

means for translating the second end of said spring means relative to said first end of said spring means; and anti-rotation means to inhibit rotation of the second end of said spring means relative to the first end of said spring means when the second end of spring means is translated relative to the first end.

4. The omnidirectional vibration-isolating suspension apparatus as defined in claim 3 further including:

a first spring support and means for securing said spring means near its first end to said first spring support in order to inhibit relative movement between said spring means and said first spring support when the second end of said spring means is translated relative to the first end of said spring means; and a second spring support and means for securing said spring means near its second end to said second spring support in order to inhibit relative movement between said spring means and said second spring support when the second end of said spring means is translated relative to the first end of said spring means.

5. The omnidirectional vibration-isolating suspension apparatus as defined in claim 2 wherein said tilt-motion isolator comprises:

flexure means connected with said horizontal-motion isolator, said flexure means providing low rocking stiffness and high translational stiffness between the object and said horizontal-motion isolator.

6. The omnidirectional vibration-isolating suspension apparatus as defined in claim 2 wherein said vertical-motion isolator has a top and bottom end and said horizontal-motion isolator has a top and bottom end, said top end of said vertical- motion isolator being operatively connected in series to the bottom end of said horizontal-motion isolator to allow the vertical-motion and horizontal-motion isolators to operate in a substantially side-by-side arrangement.

7. The omnidirectional vibration-isolating suspension apparatus as defined in claim 6 wherein a relatively stiff structural member which connects the top of the vertical-motion isolator to the bottom end of the horizontal-motion isolator.

8. The omnidirectional vibration-isolating suspension apparatus as defined in claim 2 wherein the horizontal-motion isolator has a top and a bottom end and high stiffness for relative rotations of its top and bottom ends about any horizontal axis.

9. The omnidirectional vibration-isolating suspension apparatus as defined in claim 6 wherein said vertical-motion isolator includes a base platform which is operatively connected to said spring means and said horizontal-motion isolator includes a column base plate, and further including a flexure operatively connected between the column base plate and base platform, said flexure being relatively stiff for horizontal translations of the bottom of the horizontal-motion isolator relative to the base platform and having relatively low stiffness for vertical translation of the horizontal-motion isolator relative to the base platform.

10. The omnidirectional vibration-isolating suspension apparatus as defined in claim 2 wherein said horizontal motion isolator utilizes at least three flexible beam columns for supporting the object and reducing the transmission of horizontal vibration between the object and base.

11. A vibration-isolating suspension apparatus for supporting an object in an equilibrium position relative to a base while suppressing the transmission of vibratory motion between the object and the base, comprising:

a horizontal-motion isolator having a top and a bottom end and force-supporting capability in the vertical direction for supporting the object and relative high stiffness in the vertical direction and low stiffness in any horizontal direction; and a vertical-motion isolator having a top and bottom end, said vertical-motion isolator comprising:

spring means for providing positive stiffness in the vertical direction and having force-supporting capability in the vertical direction for supporting the object; and means for producing negative stiffness in the vertical direction operatively connected with said spring means, wherein said spring means and said negative-stiffness-producing means combine to produce low vertical stiffness.

wherein the top end of said vertical-motion isolator is operatively connected in series to the bottom end of said horizontal-motion isolator to allow the vertical motion and horizontal motion isolators to operate in a substantially side-by-side arrangement.

12. An omnidirectional vibration-isolating suspension system for supporting an object in an equilibrium position relative to a base while suppressing transmission of vibratory motion between the object and the base comprising:

at least one composite suspension apparatus connected between the object and the base to support the object in an axial direction comprising:

a first suspension isolator having first and second ends and having force-supporting capability in the axial direction for supporting the object and relatively high axial stiffness and relatively low stiffness for relative translations of said first and second ends in directions transverse to the axial direction;

a second suspension isolator axially in series with said first suspension isolator including:

spring means having first and second ends adapted to provide positive stiffness in the axial direction and having force-supporting capability in the axial direction for supporting the object; and means for producing negative stiffness in the axial direction operatively connected with said spring means, wherein said spring means and said negative-stiffness-producing means combine to produce low axial stiffness; and a tilt-motion isolator axially connected to either said first or second suspension isolator and having force-supporting capability in the axial direction for supporting the object, said tilt-motion isolator having relatively low rocking stiffness for reducing rocking vibrations between the object and base.

13. The omnidirectional vibration-isolating suspension system as defined in claim 12 wherein said tilt-motion isolator comprises a rod with a reduced diameter section.

14. An omnidirectional vibration-isolating suspension system for supporting an object in an equilibrium position relative to a base while suppressing transmission of vibratory motion between the object and the base comprising:

at least one composite suspension apparatus connected between the object and the base to support the object in an axial direction comprising:

a first suspension isolator having first and second ends and having force-supporting capability in the axial direction for supporting the object and relatively high axial stiffness and relatively low stiffness for relative translation of said first and second ends in directions transverse to the axial direction;

a second suspension isolator connected axially in series with said first suspension isolator including:

a base platform;

spring means having a first and second end for providing positive stiffness in the axial direction and having force-supporting capability in the axial direction for supporting the object, said spring means being operatively connected with said base platform;

adjusting means for translating the second end of said spring means relative to said first end of said spring means to adjust the force supporting capability of the second isolator in the axial direction;

a first spring support including means for securing said spring means near its first end to said first spring support in order to inhibit relative movement between said spring means and said first spring support when the second end of said spring means is translated relative to the first end of said spring means;

a second spring support including means for securing said spring means near its second end to said second spring support in order to inhibit relative movement between said spring means and said second spring support when the second end of said spring means is translated relative to the first end of said spring means;

anti-rotation means to inhibit rotation of the second end of said spring means to prevent torsional deformation of said spring means as said second end of said spring means is translated by said adjusting means relative to the first end of said spring means; and means for producing negative stiffness in the axial direction operatively connected with said first spring support wherein said spring means and said negative-stiffness-producing means combine to produce low axial stiffness for said second suspension isolator.

15. The omnidirectional vibration-isolating suspension system as defined in claim 14 wherein said means for producing negative stiffness in the axial direction is operatively connected with a central hub assembly which is connected to said first spring support, said spring means and said negative-stiffness-producing means combining to produce low axial stiffness for said second suspension isolator, said negative-stiffness-producing means comprising at least a first and a second radial flexure assembly, each radial flexure assembly being oriented in a radial direction transverse to the axial direction, said first and second radial flexure assemblies having first and second ends, wherein said first end of said first radial flexure assembly attaches to a stiff support post which extends from said base platform and said second end of said first radial flexure assembly attaches to said central hub assembly, said first end of said second radial flexure assembly attaches to said central hub assembly and said second end of said second radial flexure assembly attaches to a pre-deformed elastic structure that produces compressive loading of said first and second radial flexure assemblies.

16. A vibration isolator having force-supporting capability in an axial direction for supporting an object in an equilibrium position relative to a base while suppressing transmission of vibratory motion between the object and the base comprising:

a base platform;

spring means having a first and a second end for providing positive stiffness in the axial direction and having force-supporting capability in the axial direction for supporting the object, said spring means being operatively connected with said base;

a central hub assembly attached to said first end of said spring means for supporting the object; and means for producing negative stiffness in the axial direction operatively connected with said central hub assembly wherein said spring means and said negative-stiffness-producing means combine to produce low axial stiffness for said vibration isolator, said negative-stiffness-producing means comprising at least a first and a second radial flexure assembly, each radial flexure assembly being oriented in a radial direction transverse to the axial direction, said first and second radial flexure assemblies having first and second ends, wherein said first end of said first radial flexure assembly attaches to a stiff support post which extends from said base platform and said second end of said first radial flexure assembly attaches to said central hub assembly, said first end of said second radial flexure assembly attaches to said central hub assembly and said second end of said second radial flexure assembly attaches to a pre-deformed elastic structure that produces compressive loading of said first and second radial flexure assemblies.

17. The vibration isolator as defined in claim 16 wherein each of said radial flexure assemblies comprises at least two plate-like flexures lying in planes transverse to the axial direction and spaced apart from each other in the axial direction.

18. The vibration isolator as defined in claim 16 further including means to adjust the radial force exerted on said first and second radial flexure assemblies.

19. The vibration isolator as defined in claim 18 wherein said means to adjust the radial force exerted on said first and second radial flexure assemblies comprises a flexure extending from the base platform and operatively connected with said second radial flexure assembly.

20. The vibration isolator as-defined in claim 16 wherein each of said first and second radial flexure assemblies comprises:

at least two parallel radial flexure subassemblies spaced apart from each other in a direction transverse to the axial direction and transverse to the radial direction, wherein each of said radial flexure subassemblies comprises at least two plate-like flexures which lie in planes transverse to the axial direction and are spaced apart from each other in the axial direction.

21. The vibration isolator as defined in claim 16 wherein said pre-deformed elastic structure which attaches to said second end of said second radial flexure assembly has relatively low stiffness for radial displacements relative to said base platform and relatively high stiffness for rotations, axial translations or translations transverse to the axial direction and transverse to the radial direction, relative to said base platform.

22. The vibration isolator as defined in claim 21 wherein said pre-deformed elastic structure comprises:

at least two parallel plate-like flexures lying in planes oriented in the axial direction and transverse to the radial direction and spaced apart from each other in the radial direction, said plate-like flexures being operatively connected between said second end of said second radial flexure assembly and said base platform.

23. A vibration isolator having force-supporting capability in the vertical direction for supporting an object in an equilibrium position relative to a base while suppressing transmission of vibratory motion between the object and the base comprising:

spring means having first and second ends for providing positive stiffness in the vertical direction and having force-supporting capability in the vertical direction for supporting the object;

means for producing negative stiffness in the vertical direction operatively connected with said spring means, wherein said spring means and said negative-stiffness-producing means combine to produce low vertical stiffness;

means for translating the second end of said spring means relative to said first end of said spring means; and anti-rotation means to inhibit rotation of the second end of said spring means relative to the first end of said spring means when the second end of spring means is translated relative to the first end.

24. The vibration isolator as defined in claim 23 further including:

a first spring support connected to said first end of said spring means;

a second spring support connected to said second end of said spring means; and means for securing said spring means near its second end to said second spring support in order to inhibit relative movement between said spring means and said second spring support when the second end of said spring means is translated relative to the first end of said spring means.

25. A vibration isolator having force-supporting capability in the vertical direction for supporting an object in an equilibrium position relative to a base while suppressing transmission of vibratory motion between the object and the base comprising:

spring means having first and second ends for providing positive stiffness in the vertical direction and having force-supporting capability in the vertical direction for supporting the object;

a central hub assembly attached to said first end of said spring means for supporting the object; and means for producing negative stiffness in the vertical direction attached to said central hub assembly and operatively connected with said spring means, wherein said spring means and said negative-stiffness-producing means combine to produce low vertical stiffness for said vibration isolator and relatively high stiffness for rotations or horizontal translations of said central hub assembly relative to said base.

26. A vibration isolator having force-supporting capability in the vertical direction for supporting an object in an equilibrium position relative to a base while suppressing transmission of vibratory motion between the object and the base comprising:

spring means having first and second ends for providing positive stiffness in the vertical direction and having force-supporting capability in the vertical direction for supporting the object;

a central hub assembly attached to said first end of said spring means for supporting the object;

a base platform operatively connected to said second end of said spring means;

a stiff structural member having first and second ends, with said first end connected to said central hub assembly and said second end located near said base platform;

a flexure assembly connected between said second end of said stiff structural member and said base platform; and means for producing negative stiffness in the vertical direction attached to said central hub assembly and operatively connected with said spring means; wherein said spring means, said negative-stiffness-producing means and said flexure assembly combine to produce low vertical stiffness for the vibration isolator and relatively high stiffness for rotations or horizontal translations of said stiff structural member relative to said base platform.

* * * * *